(12) United States Patent
Fisher et al.

(10) Patent No.: US 8,011,887 B2
(45) Date of Patent: Sep. 6, 2011

(54) ROTOR BLADE ASSEMBLY

(75) Inventors: Murray Fisher, Simpsonville, SC (US);
Stefan Herr, Greenville, SC (US);
David Cole Magnuson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/840,504

(22) Filed: Jul. 21, 2010

(65) Prior Publication Data
US 2011/0142681 A1 Jun. 16, 2011

(51) Int. Cl.
*F03D 7/04* (2006.01)

(52) U.S. Cl. ............................. 416/23; 416/62

(58) Field of Classification Search ............ 416/23, 416/24, 62, 146 R; 244/17.11, 17.19, 214, 244/215
See application file for complete search history.

(56) References Cited

U.S. PATENT DOCUMENTS

| | | | |
|---|---|---|---|
| 2,550,278 A * | 4/1951 | Makhonine | 244/215 |
| 2,622,686 A * | 12/1952 | Chevreau et al. | 416/23 |
| 4,537,146 A * | 8/1985 | Wainwright | 114/102.16 |
| 4,715,782 A | 12/1987 | Shimmel | |
| 5,570,859 A | 11/1996 | Quandt | |
| 5,895,015 A | 4/1999 | Saiz | |
| 6,247,670 B1 | 6/2001 | Eliahou-Niv et al. | |
| 6,499,690 B1 | 12/2002 | Katayama et al. | |
| 6,663,345 B2 | 12/2003 | Lorkowski et al. | |
| 7,204,674 B2 | 4/2007 | Wobben | |
| 7,293,959 B2 | 11/2007 | Pedersen et al. | |
| 7,424,988 B2 * | 9/2008 | McDonnell | 244/82 |

FOREIGN PATENT DOCUMENTS

EP 1995455 11/2008

* cited by examiner

*Primary Examiner* — Edward Look
*Assistant Examiner* — Ryan Ellis
(74) *Attorney, Agent, or Firm* — Dority & Manning, P.A.

(57) ABSTRACT

A rotor blade assembly is disclosed. The rotor blade assembly includes a main rotor blade, the main rotor blade including a pressure side and a suction side extending between a leading edge and a trailing edge, and an auxiliary rotor blade associated with the main rotor blade, the auxiliary rotor blade including a pressure side and a suction side extending between a leading edge and a trailing edge. The rotor blade assembly further includes a support member connecting the auxiliary rotor blade to the main rotor blade. The auxiliary rotor blade is configured to modify a lift force associated with the rotor blade assembly.

17 Claims, 6 Drawing Sheets

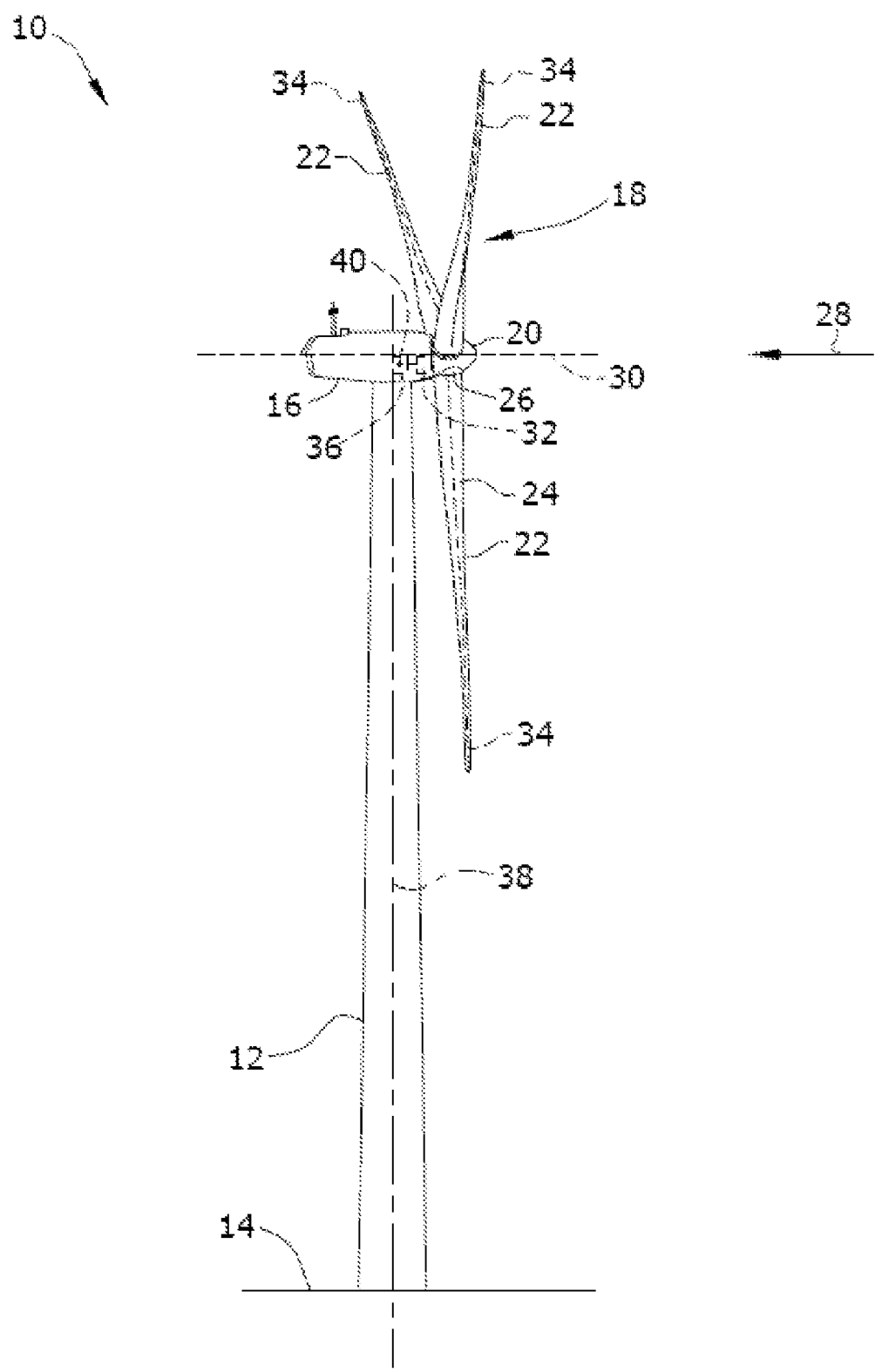
FIG. -1-

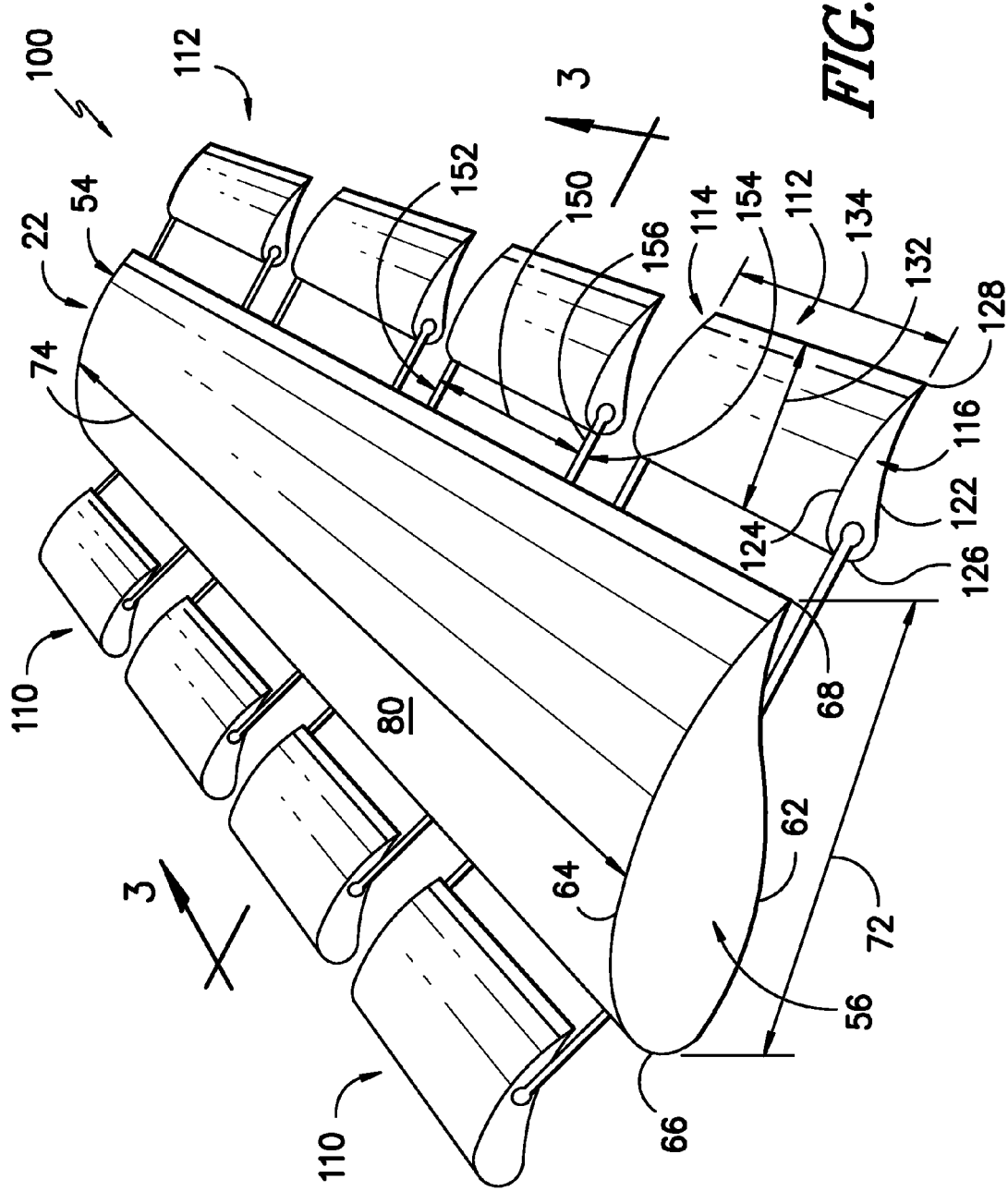
FIG. -2-

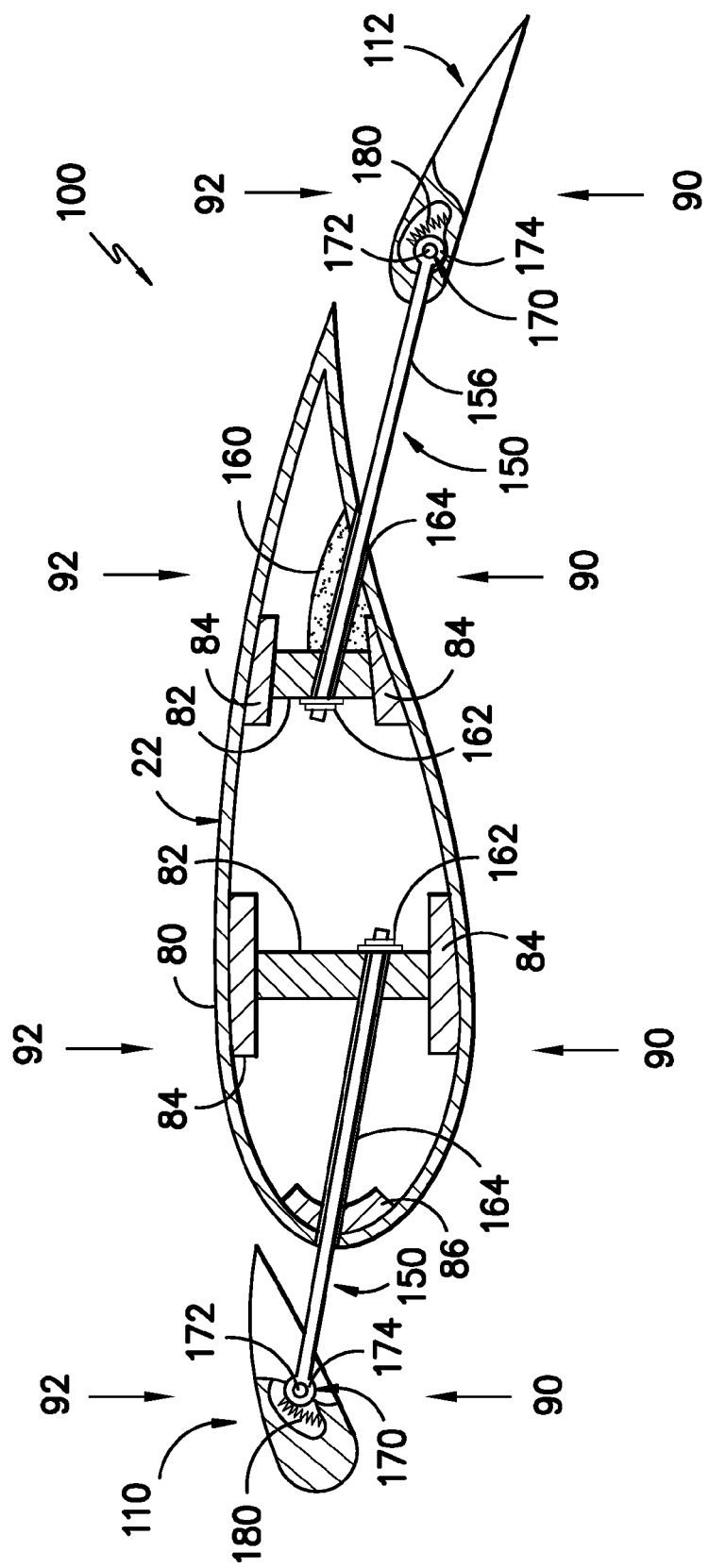
FIG. -3-

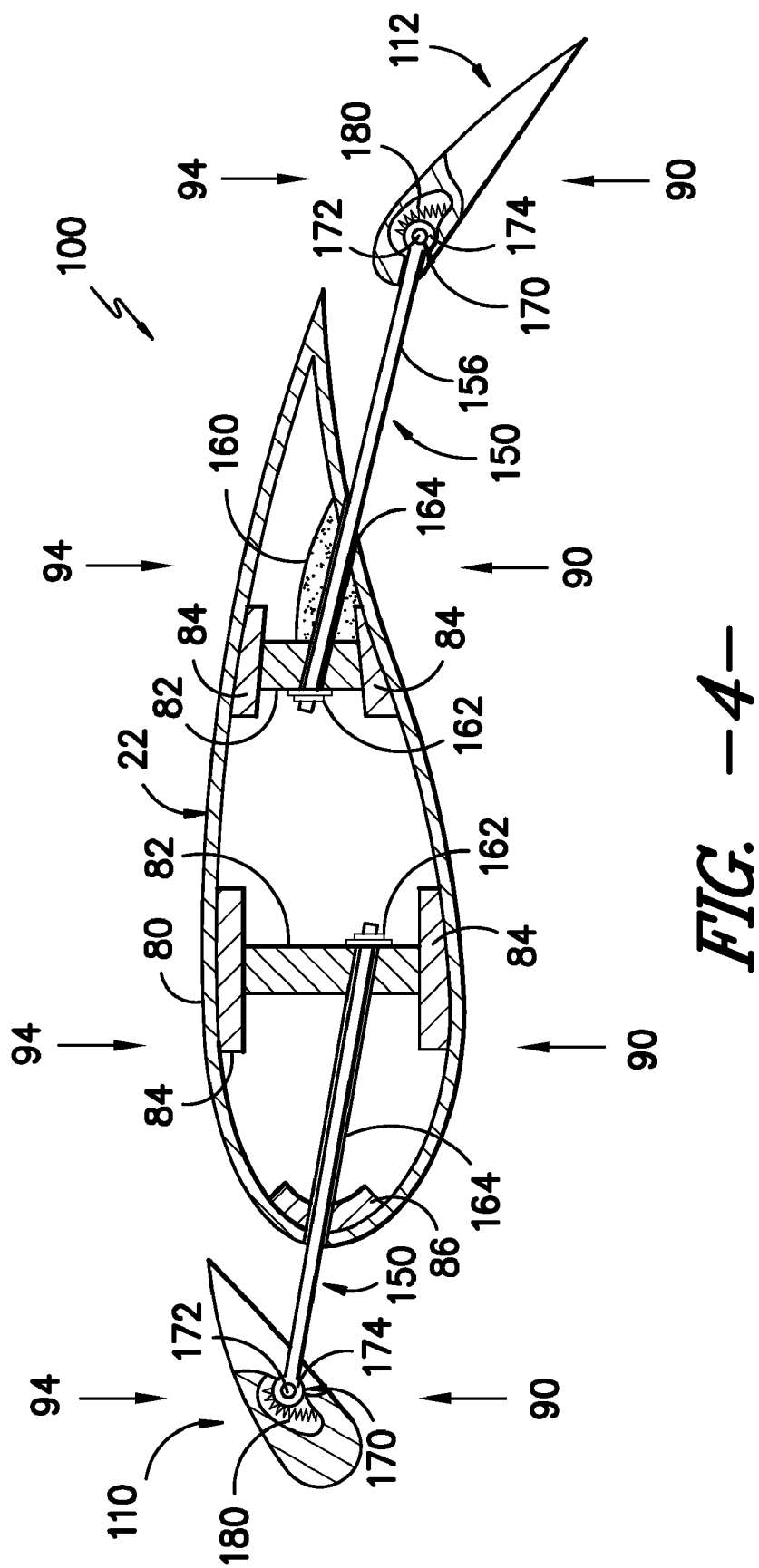
FIG. -4-

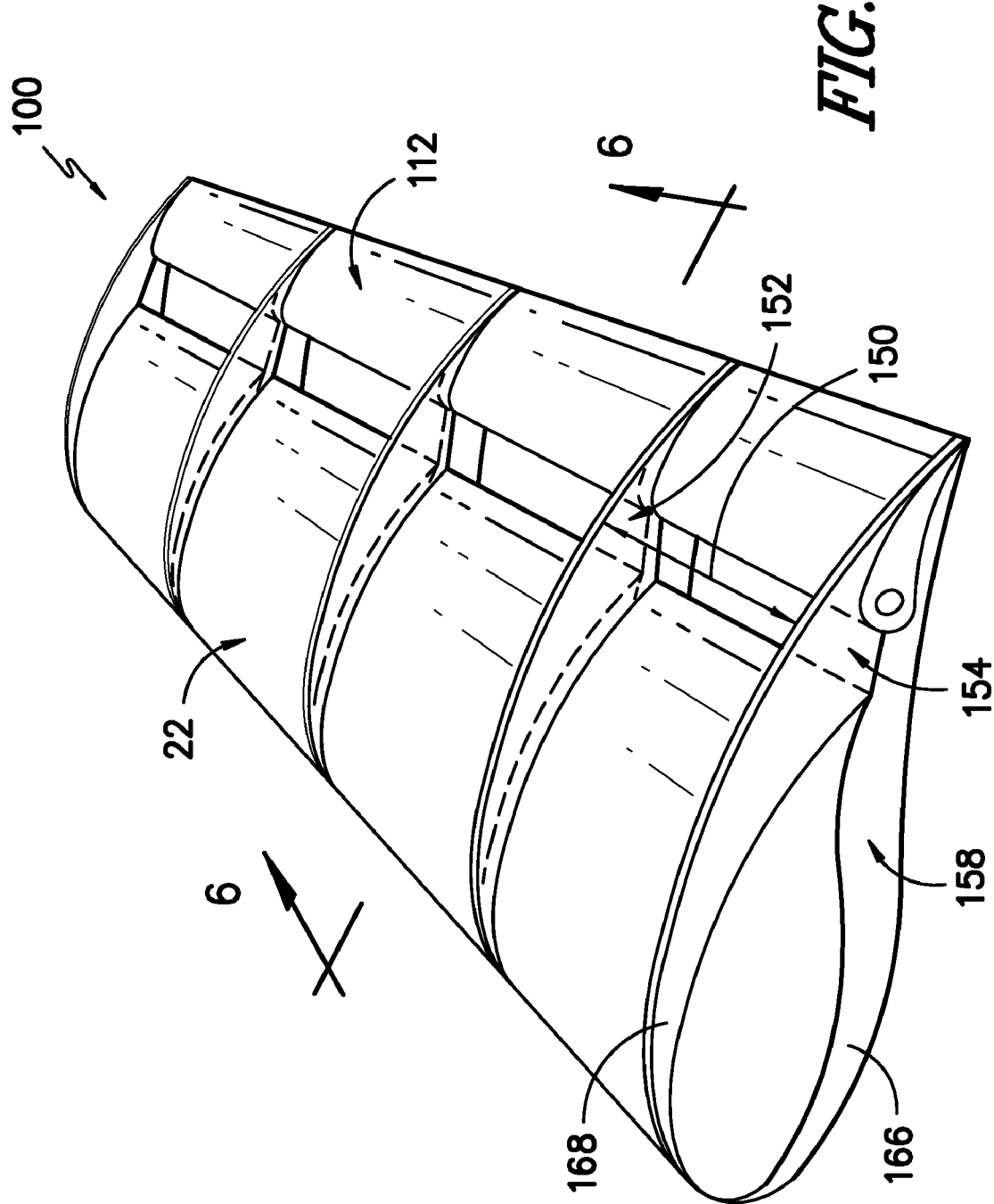
FIG. -5-

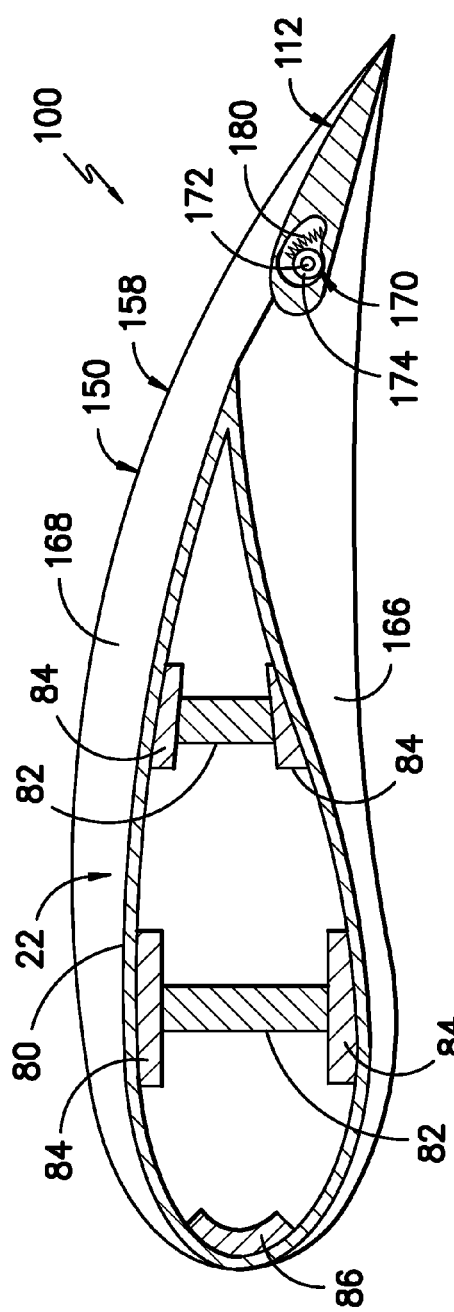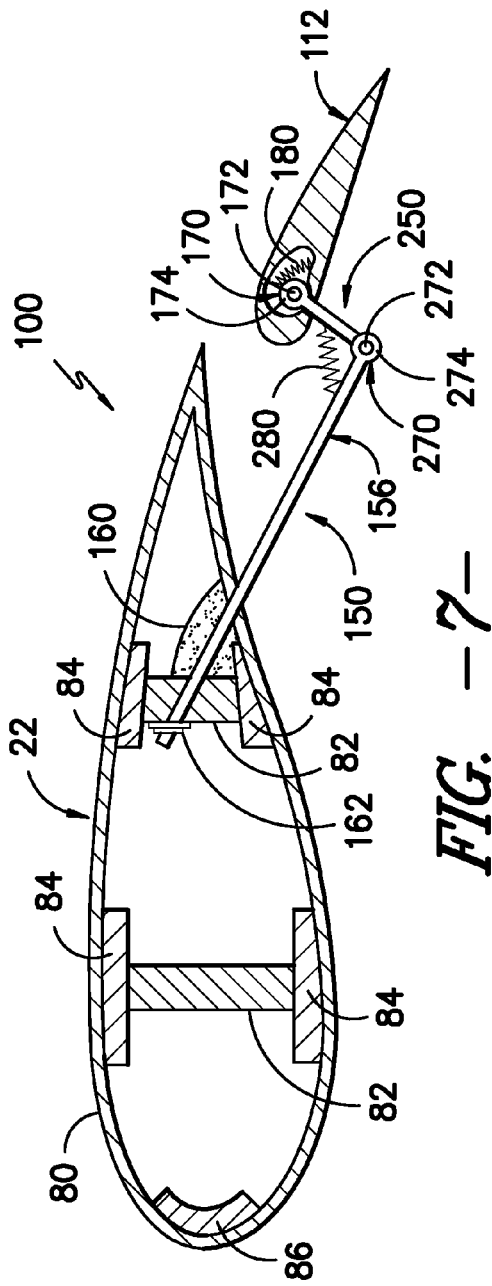

ROTOR BLADE ASSEMBLY

FIELD OF THE INVENTION

The present disclosure relates in general to rotor blades, and more particularly to multi-element rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. Presently, large commercial wind turbines in existence and in development are capable of generating from about 1.5 to about 12.5 megawatts of power. These larger wind turbines may have rotor blade assemblies larger than 90 meters in diameter. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

Presently known rotor blades, while increasing in size and thus advantageously generating higher lift forces, may have disadvantages. For example, higher lift forces result in correspondingly heavy loads on the rotor blades and other wind turbine components. These loads must be managed to prevent the rotor blades from failing or becoming damaged. Known systems and methods for managing the loads include, for example, controller modifications to and active flow control of the rotor blades. However, these systems and methods generally may not be able to respond quickly enough to the changing dynamic flow state on a rotor blade to adequately manage the heavy loads. Another known solution includes the use of aerodynamic tailoring of the rotor blade. However, the rotor blade must be aerodynamically tailored to a particular wind speed. Thus, the adjustment of an aerodynamically tailored rotor blade to the changing dynamic flow state may be relatively limited to the particular wind speed, and may not perform optimally at other wind speeds.

Accordingly, there is a need for a rotor blade assembly that can quickly adjust to a changing dynamic flow state, and that can adjust to a wide variety of wind speeds. Additionally, a rotor blade assembly that allows for smaller, lighter rotor blades that generate higher lift forces would be advantageous. Further, a rotor blade assembly that allows retrofitting of various components to existing rotor blades to provide adjustable features and higher lift forces would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a main rotor blade, the main rotor blade including a pressure side and a suction side extending between a leading edge and a trailing edge, and an auxiliary rotor blade associated with the main rotor blade, the auxiliary rotor blade including a pressure side and a suction side extending between a leading edge and a trailing edge. The rotor blade assembly further includes a support member connecting the auxiliary rotor blade to the main rotor blade. The auxiliary rotor blade is configured to modify a lift force associated with the rotor blade assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary wind turbine;

FIG. 2 is a perspective view of one embodiment of the rotor blade assembly of the present disclosure;

FIG. 3 is a cross-sectional view of one embodiment of the rotor blade assembly of the present disclosure along the line 3-3 of FIG. 2;

FIG. 4 is a cross-sectional view of the embodiment of the rotor blade assembly of the present disclosure as shown in FIGS. 2 and 3, with the rotor blade assembly experiencing a load greater than or approximately equal to a load limit 94.

FIG. 5 is a perspective view of another embodiment of the rotor blade assembly of the present disclosure;

FIG. 6 is a cross-sectional view of another embodiment of the rotor blade assembly of the present disclosure along the line 6-6 of FIG. 5; and, FIG. 7 is a cross-sectional view of yet another embodiment of the rotor blade assembly of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one main rotor blade 22 coupled to and extending outward from hub 20. In the exemplary embodiment, rotor 18 has three main rotor blades 22. In an alternative embodiment, rotor 18 includes more or less than three main rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Main rotor blades 22 are spaced about hub 20 to facilitate rotating rotor 18 to enable kinetic energy to be transferred from the wind into usable mechanical energy, and subsequently, electrical energy. Main rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to main rotor blades 22 are transferred to hub 20 via load transfer regions 26. In one embodiment, main rotor blades 22 have a length ranging from about 15 meters (m) to about 91 m. Alternatively, main rotor blades 22 may have any suitable length that enables wind turbine 10 to function as described herein. For example, other non-limiting examples of blade lengths include 10 m or less, 20 m, 37 m, or a length that is greater than 101 m. As wind strikes main rotor blades 22 from a direction 28, rotor 18 is rotated about an axis of rotation 30. As main rotor blades 22 are rotated and subjected to centrifugal forces, as well as aerodynamic and gravitational forces, main rotor blades 22 are also subjected to various forces and moments. As such, main rotor blades 22 may deflect and/or rotate from a neutral, or non-deflected, position to a deflected position. Moreover, a pitch angle or blade pitch of main rotor blades 22, i.e., an angle that determines a perspective of main rotor blades 22 with respect to direction 28 of the wind, may be changed by a pitch adjustment system 32 to control the load and power generated by wind turbine 10 by adjusting an angular position of at least one main rotor blade 22 relative to wind vectors such as those in direction 28. Pitch axes 34 for main rotor blades 22 are shown. During operation of wind turbine 10, pitch adjustment system 32 may change a blade pitch of main rotor blades 22 such that main rotor blades 22 are moved to a feathered position, such that the perspective of at least one main rotor blade 22 relative to wind vectors provides a minimal surface area of main rotor blade 22 to be oriented towards the wind vectors such as those in direction 28, which facilitates reducing a rotational speed of rotor 18 and/or facilitates the prevention of stall of rotor 18.

In the exemplary embodiment, a blade pitch of each main rotor blade 22 is controlled individually by a control system 36. Alternatively, the blade pitch for all main rotor blades 22 may be controlled simultaneously by control system 36. Further, in the exemplary embodiment, as direction 28 changes, a yaw direction of nacelle 16 may be controlled about a yaw axis 38 to position main rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring to FIGS. 2 through 7, a main rotor blade 22 in accordance with the present disclosure is illustrated. The main rotor blade 22 may extend from a blade tip 54 to a blade root 56, and may include a pressure side 62 and a suction side 64 extending between a leading edge 66 and a trailing edge 68. The main rotor blade 22 may further have a chord 72 and a span 74. Further, the chord 72 may vary with respect to the span 74, and/or the span 74 may vary with respect to the chord 72. In some embodiments, the main rotor blade 22 may be separated into a variety of main rotor blade 22 components. In general, the main rotor blade 22 may have any suitable aerodynamic profile. For example, in an exemplary embodiment, the main rotor blade 22 may have a swept shape giving it a curved contoured aerodynamic profile. In an alternative embodiment, the main rotor blade 22 may have a non-swept shape and respective aerodynamic profile.

The main rotor blade 22 may, in exemplary embodiments, be aeroelastically tailored. Aeroelastic tailoring of the main rotor blade 22 may entail bending main rotor blade 22 in a generally flapwise direction and/or in a generally edgewise direction. The flapwise direction is a direction substantially perpendicular to a transverse axis through a cross-section of the widest side of the main rotor blade 22. Alternatively, the flapwise direction may be construed as the direction (or the opposite direction) in which the aerodynamic lift acts on the main rotor blade 22. The edgewise direction is perpendicular to the flapwise direction. Aeroelastic tailoring of the main rotor blade 22 may further entail twisting of the main rotor blade 22, such as with respect to the generally flapwise or edgewise direction, if desired.

The main rotor blade 22 of the present disclosure may have any suitable internal and external structure. For example, the main rotor blade 22 may have an outer shell 80. The outer shell 80 may be a unitary shell, or may include a variety of shell components. The outer shell 80 may generally forms the exterior aerodynamic profile of the main rotor blade 22. Additionally, in exemplary embodiments, the main rotor blade 22 may include a shear web 82 or a plurality of shear webs 82 extending between spar caps 84. Further, in some embodiments, the main rotor blade 22 may include a bonding cap 86. It should be understood, however, that the internal and external structure of the main rotor blade 22 is not limited to the structure disclosed herein. Rather, the main rotor blade 22 of the present disclosure may have any suitable internal and external structure.

The main rotor blade 22 of the present disclosure, during operation of the wind turbine 10, may generally experience a lift force 90 and a corresponding load 92, as shown in FIGS. 3 and 4. In some situations and environments, such as during periods of high winds, the main rotor blade 22 may incur an increased load 92 that is greater than or approximately equal to a load limit 94. Load limit 94 may be, for example, a maximum load that the main rotor blade 22 can incur, with or without a factor of safety, or a load design point. This increased loading may be incurred by the main rotor blade 22 due to, for example, a strong gust of wind. Without apparatus to account for this increased loading, the main rotor blade 22 may fatigue or fail.

Thus, as shown in FIGS. 2 through 7, a rotor blade assembly 100 is disclosed. The rotor blade assembly 100 may include a main rotor blade 22, as discussed above. Further, the rotor blade assembly 100 may include an auxiliary rotor blade 110, 112 or a plurality of auxiliary rotor blades 110, 112 associated with the main rotor blade 22. Each auxiliary rotor blade 110, 112 may extend from an auxiliary blade tip 114 to an auxiliary blade root 116, and may include a pressure side 122 and a suction side 124 extending between a leading edge 126 and a trailing edge 128. Each auxiliary rotor blade 110, 112 may further have a chord 132 and a span 134. Further, the chord 132 may vary with respect to the span 134, and/or the span 134 may vary with respect to the chord 132. Each auxiliary rotor blade 110, 112 may have any suitable aerodynamic profile with, for example, any various aerodynamic characteristics similar to or different from the main rotor blade 22, as discussed above.

Further, the auxiliary rotor blades 110, 112 of the present disclosure may each have any suitable internal and external structure. For example, the auxiliary rotor blades 110, 112 may each have an outer shell (not shown). The outer shell may be a unitary shell, or may include a variety of shell components. The outer shell may generally forms the exterior aerodynamic profile of the auxiliary rotor blades 110, 112. Additionally, in exemplary embodiments, the auxiliary rotor blades 110, 112 may each include a shear web (not shown) or a plurality of shear webs extending between spar caps (not shown). Further, in some embodiments, the auxiliary rotor blades 110, 112 may each include a bonding cap (not shown). It should be understood, however, that the internal and external structure of the auxiliary rotor blades 110, 112 are not limited to the structure disclosed herein. Rather, the auxiliary rotor blades 110, 112 of the present disclosure may have any suitable internal and external structure.

The auxiliary rotor blades 110, 112 of the present disclosure may generally be associated with any portion of the main rotor blade 22. For example, an auxiliary rotor blade 110, 112 or auxiliary rotor blades 110, 112 may be associated with the pressure side 62, the suction side 64, the leading edge 66, or the trailing edge 68 of the main rotor blade 22. As shown in FIGS. 2 through 4, in one embodiment, the rotor blade assembly 100 of the present disclosure includes a plurality of auxiliary rotor blades 110 associated with the leading edge 66 and a plurality of auxiliary rotor blades 112 associated with the trailing edge 68 of the main rotor blade 22. In alternative embodiments, as shown in FIGS. 5 through 7, the rotor blade assembly 100 of the present disclosure includes a plurality of auxiliary rotor blades 112 associated only with the trailing edge 68 of the main rotor blade 22.

The auxiliary rotor blades 110, 112 may, in some embodiments, be generally aligned along at least a portion of the span 74 of the main rotor blade 22, as shown in FIGS. 2 and 5. The auxiliary rotor blades 110, 112 may be disposed directly adjacent to and/or in contact with each other in the direction of the span 34, or may be spaced from each other in the direction of the span 34, as desired.

Additionally, the auxiliary rotor blade 110, 112 may be disposed directly adjacent to and/or in contact with the main rotor blade 22, or may be spaced from the main rotor blade 22, as desired to provide optimal lift performance.

It should be understood that while the embodiments shown in FIGS. 2 through 7 illustrate a plurality of auxiliary rotor blades 110, 112 each having a span 134 shorter than the span 74 of the main rotor blade 22, in alternative embodiments, an auxiliary rotor blade 110, 112 of the present disclosure may have a span 134 greater than or equal to the span 74 of the main rotor blade 22. For example, if desired, one or more auxiliary rotor blades 110, 112 with spans 134 approximately equal to the span 74 of the main rotor blade 22 may be associated with the main rotor blade 22.

Further, it should be understood that the auxiliary rotor blades 110, 112 are not limited to any particular chord 132, any particular aerodynamic profile, or any other rotor blade characteristic. Further, it should be understood that each auxiliary rotor blade 110, 112 may have individual characteristics that vary from the characteristics of other auxiliary rotor blades 110, 112.

The auxiliary rotor blade 110, 112 of the present disclosure may be configured to modify the lift force 90 associated with the rotor blade assembly 100. For example, in some embodiments, the auxiliary rotor blade 110, 112 may provide extra lift to the rotor blade assembly 100. Alternatively, the auxiliary rotor blade 110, 112 may enable a main rotor blade 22 that has lost some lift performance due to, for example, fouling or erosion, to regain that lift performance. Further, the auxiliary rotor blade 110, 112 may allow the size of the main rotor blade 22 to be reduced while maintaining a suitably high lift force 90.

The rotor blade assembly 100 of the present disclosure may further include a support member 150 or plurality of support members 150 connecting the auxiliary rotor blades 110, 112 to the main rotor blade 22. For example, in some embodiments, as shown in FIGS. 2 and 5, the plurality of support members 150 may include a tip support member 152 associated with the blade tip 114 and a root support member 154 associated with the blade root 116 of each auxiliary rotor blade 110, 112. Alternatively, any number of support members 150 may be associated with any portion of each auxiliary rotor blade 110, 112. For example, an auxiliary rotor blade 110, 112 may be connected to the main rotor blade 22 by one support member 150 associated with the leading edge 126, or any other portion, of the auxiliary rotor blade 110, 112, or by two or more support members 150 associated with the leading edge 126, or any other portion, of the auxiliary rotor blade 110, 112.

In one exemplary embodiment, as shown in FIGS. 2 through 4 and 7, the support members 150 may be support rods 156. In another exemplary embodiment, as shown in FIGS. 5 and 6, the support members 150 may be support frames 158.

Referring to FIGS. 2 through 4 and 7, the support rods 156 may each be supported at one end by any component of the internal or external structure of the main rotor blade 22. For example, the support rods 156 may be associated with shear webs 82 of the main rotor blade 22. Alternatively, the support rods 156 may be associated with the bonding cap 86, or with spar caps 84, or with any other suitable internal or external structure of the main rotor blade 22. As shown, an adhesive 160 and/or a retaining device or devices 162, such as a nut and/or a washer, a pin or pins, a bracket or brackets, or any other suitable retaining devices 162, may be utilized to support and secure the support rods 156 to the main rotor blade 22.

In some exemplary embodiments, the rotor blade assembly 100 of the present disclosure may include a guide tube 164 or a plurality of guide tubes 164. The guide tubes 164 may extend through at least a portion of the main rotor blade 22, such as through the outer shell 80 and through any portion of the inner structure, such as through a shear web 82. The guide tubes 164 may further be configured to accept at least a portion of the support rods 156. For example, each guide tube 164 may have a cross-section of a shape and size suitable to accept at least a portion of a support rod 156. The guide tube 164 may be secured to the main rotor blade 22 through the use of, for example, an adhesive 160 and/or a retaining device 162. The support rod 156 may be secured within the guide tube 164 through the use of, for example, an adhesive 160 and/or a retaining device 162. Alternatively or additionally, the support rod 156 may extend into the main rotor blade 22 beyond the guide tube 164, and may be secured in the main rotor blade 22 through the use of an adhesive 160 and/or a retaining device 162.

Referring to FIGS. 5 and 6, the support frames 158 may be unitary frames or may be formed from a plurality of frame components. For example, in the embodiment as shown in FIGS. 5 and 6, the support frame 158 has a lower support frame component 166 and an upper support frame component 168. The support frames 158 may be fastened to the main rotor blade 22 through the use of an adhesive 160 and/or a retaining device or devices 162.

The auxiliary rotor blades 110, 112 may be secured to the support members 150, such as through the use of adhesive 160 and/or a retaining device 162. In this embodiment, the auxiliary rotor blades 110, 112 may generally be rigid. In alternative exemplary embodiments, as shown in FIGS. 2 through 7, however, the auxiliary rotor blades 110, 112 may be configured to be passively activated when the rotor blade assembly 100 incurs a load 92 greater than or approximately equal to a load limit 94. For example, as discussed below, the auxiliary rotor blades 110, 112 may be pivotally connected to the support members 150.

For example, as shown in FIGS. 2 through 7, the rotor blade assembly 100 of the present disclosure may include a pivot point 170 or a plurality of pivot points 170. The pivot points 170 may be disposed at the connections between the auxiliary rotor blades 110, 112 and the support members 150, and may allow the auxiliary rotor blades 110, 112 to pivot about the support members 150. The pivot points 170 may include, for example, transverse pins or rods 172 and bearings 174 to facilitate the pivotal movement of the auxiliary rotor blades 110, 112 about the support members 150.

Further, in exemplary embodiments, the rotor blade assembly 100 of the present disclosure may include a spring element 180 or a plurality of spring elements 180. The spring elements 180 may be configured to resist the pivotal movement of the auxiliary rotor blades 110, 112 about the support members 150. For example, the spring elements 180 may be springs or any other suitable components that may resist movement. The spring elements 180 may be connected to the auxiliary rotor blades 110, 112 and the support members 150, and may provide a resistant force against the auxiliary rotor blades 110, 112 when the auxiliary rotor blades 110, 112 attempt to pivot about the support members 150. For example, the spring elements 180 may provide a resistant force against the auxiliary rotor blades 110, 112 to prevent the auxiliary rotor blades 110, 112 from pivoting about the support members 150 when the rotor blade assembly 100 is subjected to a load 92.

In further exemplary embodiments, however, the spring elements 180 may be configured to allow pivotal movement of the auxiliary rotor blades 110, 112 about the support members 150 when the rotor blade assembly 100 incurs a load 92 that is greater than or approximately equal to a load limit 94. For example, as discussed above, in some situations and environments, such as during periods of high winds, the main rotor blade 22 may incur an increased load 92 that is greater than or approximately equal to a load limit 94. When the load limit 94 is reached, the spring elements 180 may allow the auxiliary rotor blades 110, 112 to pivot about the support members 150. When the auxiliary rotor blades 110, 112 pivot about the support members 150, the lift force 90 experienced by the rotor blade assembly 100 may be reduced, thus reducing the load 92 to less than or approximately equal to the load limit 94 and potentially preventing the rotor blade assembly 100 from fatiguing or failing due to unexpectedly high loading.

In some exemplary embodiments, as shown in FIG. 7, the support members 150 of the present disclosure may include secondary support members 250. The secondary support members 250 may connect the auxiliary rotor blades 110, 112 to the support members 150. For example, the support members 150 may connect the main rotor blade 22 and the secondary support members 250, and the secondary support members 250 may connect the support members 150 and the auxiliary rotor blades 110, 112.

As discussed above with regard to the primary support members 150, in one embodiment, the secondary support members 250 may be secured to the auxiliary rotor blades 110, 112, such as through the use of adhesive 160 and/or a retaining device 162. In alternative exemplary embodiments, as shown in FIG. 7 and as discussed above with regard to the support members 150, however, the secondary support members 250 may be pivotally connected to the auxiliary rotor blades 110, 112, such as through pivot points 170 and, optionally, spring elements 180.

Further, in one embodiment, the secondary support members 250 may be secured to the support members 150, such as through the use of adhesive 160 and/or a retaining device 162. In alternative exemplary embodiments, as shown in FIG. 7, however, the secondary support members 250 may be pivotally connected to the support members 150.

For example, as shown in FIG. 7, the rotor blade assembly 100 of the present disclosure may include a secondary pivot point 270 or a plurality of secondary pivot points 270. The secondary pivot points 270 may be disposed at the connections between the support members 150 and secondary support members 250, and may allow the secondary support members 250 to pivot about the support members 150. The secondary pivot points 270 may include, for example, transverse pins or rods 272 and bearings 274 to facilitate the pivotal movement of the secondary support members 250 about the support members 150.

Further, in exemplary embodiments, the rotor blade assembly 100 of the present disclosure may include a secondary spring element 280 or a plurality of secondary spring elements 280. The secondary spring elements 280 may be configured to resist the pivotal movement of the secondary support members 250 about the support members 150. For example, the secondary spring elements 280 may be springs or any other suitable components that may resist movement. The secondary spring elements 280 may be connected to the secondary support members 250 and the support members 150, and may provide a resistant force against the secondary support members 250 when the secondary support members 250 attempt to pivot about the support members 150. For example, the secondary spring elements 280 may provide a resistant force against the secondary support members 250 to prevent the secondary support members 250 from pivoting about the support members 150 when the rotor blade assembly 100 is subjected to a load 92.

In further exemplary embodiments, however, the secondary spring elements 280 may be configured to allow pivotal movement of the secondary support members 250 about the support members 150 when the rotor blade assembly 100 incurs a load 92 that is greater than or approximately equal to a load limit 94. For example, as discussed above, in some situations and environments, such as during periods of high winds, the main rotor blade 22 may incur an increased load 92 that is greater than or approximately equal to a load limit 94. When the load limit 94 is reached, the secondary spring elements 280 may allow the secondary support members 250 to pivot about the support members 150. When the secondary support members 250 pivot about the support members 150, the lift force 90 experienced by the rotor blade assembly 100 may be reduced, thus reducing the load 92 to less than or approximately equal to the load limit 94 and potentially preventing the rotor blade assembly 100 and/or other various components, such as structural or electrical components, of the wind turbine 10 from fatiguing or failing due to unexpectedly high loading.

Thus, the rotor blade assembly 100 of the present disclosure may allow for smaller, lighter main rotor blades 22 that generate higher lift forces 90 through the inclusion of auxiliary rotor blades 110, 112, and/or may allow for larger main rotor blades 22 that operate closer to load limit 94. Additionally, the rotor blade assembly 100 may allow retrofitting of various components, such as auxiliary rotor blades 110, 112, to existing rotor blades 22 to provide adjustable features and higher lift forces 90. Further, the rotor blade assembly 100 of the present disclosure may, in some embodiments, quickly adjust to a changing dynamic flow state and a wide variety of wind speeds, and may quickly account for changes in the lift force 90 and load 92 incurred by the rotor blade assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
    a main rotor blade, the main rotor blade including a pressure side and a suction side extending between a leading edge and a trailing edge;
    an auxiliary rotor blade associated with the main rotor blade, the auxiliary rotor blade including a pressure side and a suction side extending between a leading edge and a trailing edge; and,
    a support member connecting the auxiliary rotor blade to the main rotor blade,
    wherein the auxiliary rotor blade is configured to modify a lift force associated with the rotor blade assembly, and wherein the auxiliary rotor blade is configured to be passively activated when the rotor blade assembly incurs a load greater than or approximately equal to a load limit.

2. The rotor blade assembly of claim 1, wherein the auxiliary rotor blade is associated with one of the pressure side, the suction side, the leading edge, or the trailing edge of the main rotor blade.

3. The rotor blade assembly of claim 1, wherein the auxiliary rotor blade is a plurality of auxiliary rotor blades.

4. The rotor blade assembly of claim 1, wherein the support member is a plurality of support members.

5. The rotor blade assembly of claim 4, wherein the plurality of support members include a root support member associated with a root end of the auxiliary rotor blade and a tip support member associated with a tip end of the auxiliary rotor blade.

6. The rotor blade assembly of claim 1, wherein the support member is a support rod.

7. The rotor blade assembly of claim 6, furthering comprising a guide tube, the guide tube extending through at least a portion of the main rotor blade and configured to accept at least a portion of the support rod.

8. The rotor blade assembly of claim 1, wherein the support member is a support frame.

9. The rotor blade assembly of claim 1, wherein the auxiliary rotor blade is pivotally connected to the support member.

10. The rotor blade assembly of claim 9, further comprising a spring element, the spring element configured to resist pivotal movement of the auxiliary rotor blade about the support member.

11. The rotor blade assembly of claim 10, wherein the spring element is configured to allow pivotal movement of the auxiliary rotor blade about the support member when the rotor blade assembly incurs a load greater than or approximately equal to a load limit.

12. The rotor blade assembly of claim 1, further comprising a secondary support member connecting the support member and the auxiliary rotor blade, the secondary support member pivotally connected to the support member.

13. The rotor blade assembly of claim 12, further comprising a secondary spring element, the secondary spring element configured to resist pivotal movement of the secondary support member about the support member.

14. The rotor blade assembly of claim 13, wherein the secondary spring element is configured to allow pivotal movement of the secondary support member about the support member when the rotor blade assembly incurs a load greater than or approximately equal to a load limit.

15. A rotor blade assembly, comprising:
    a main rotor blade, the main rotor blade including a pressure side and a suction side extending between a leading edge and a trailing edge, the main rotor blade having a span;
    a plurality of auxiliary rotor blades associated with the main rotor blade, the auxiliary rotor blades each including a pressure side and a suction side extending between a leading edge and a trailing edge, the plurality of auxiliary rotor blades generally aligned along at least a portion of the span of the main rotor blade;
    a plurality of support members connecting the plurality of auxiliary rotor blades to the main rotor blade, at least a portion of the plurality of auxiliary rotor blades pivotally connected to the plurality of support members, the plurality of support members include a plurality of root support members and a plurality of tip support members, each of the plurality of root support members associated with a root end of one of the plurality of auxiliary rotor blades and each of the plurality of tip support members associated with a tip end of one of the plurality of auxiliary rotor blades; and,
    a plurality of spring elements associated with at least a portion of the plurality of support members and at least a portion of the plurality of auxiliary rotor blades, the plurality of spring elements configured to resist pivotal movement of at least a portion of the plurality of auxiliary rotor blades about at least a portion of the plurality of support members,
    wherein the plurality of auxiliary rotor blades are configured to modify a lift force associated with the rotor blade assembly, and wherein the plurality of auxiliary rotor blades are configured to be passively activated when the rotor blade assembly incurs a load greater than or approximately equal to a load limit.

16. The rotor blade assembly of claim 15, wherein the plurality of spring elements are configured to allow pivotal movement of at least a portion of the plurality of auxiliary rotor blade about at least a portion of the plurality of support members when the rotor blade assembly incurs a load greater than or approximately equal to a load limit.

17. A rotor blade assembly, comprising:
- a main rotor blade, the main rotor blade including a pressure side and a suction side extending between a leading edge and a trailing edge, the main rotor blade having a span;
- a plurality of auxiliary rotor blades associated with the main rotor blade, the auxiliary rotor blades each including a pressure side and a suction side extending between a leading edge and a trailing edge, the plurality of auxiliary rotor blades generally aligned along at least a portion of the span of the main rotor blade; and,
- a plurality of support members connecting the plurality of auxiliary rotor blades to the main rotor blade,
- wherein the plurality of auxiliary rotor blades are configured to modify a lift force associated with the rotor blade assembly, and wherein the plurality of auxiliary rotor blades are configured to be passively activated when the rotor blade assembly incurs a load greater than or approximately equal to a load limit.

* * * * *

UNITED STATES PATENT AND TRADEMARK OFFICE
CERTIFICATE OF CORRECTION

PATENT NO. : 8,011,887 B2
APPLICATION NO. : 12/840504
DATED : September 6, 2011
INVENTOR(S) : Fisher et al.

Page 1 of 1

It is certified that error appears in the above-identified patent and that said Letters Patent is hereby corrected as shown below:

In the Claims:

Column 9, line 66, claim 7, "furthering" should read --further--.

Signed and Sealed this
Twentieth Day of August, 2013

Teresa Stanek Rea
*Acting Director of the United States Patent and Trademark Office*